United States Patent
Sarkar et al.

(10) Patent No.: US 10,187,364 B2
(45) Date of Patent: Jan. 22, 2019

(54) WEARABLE USER DEVICE FOR USE IN A USER AUTHENTICATION SYSTEM

(71) Applicant: Plantronics, Inc., Santa Cruz, CA (US)

(72) Inventors: Shantanu Sarkar, San Jose, CA (US); Timothy P Johnston, Los Gatos, CA (US); Cary Bran, Seattle, WA (US); Joe Burton, Los Gatos, CA (US)

(73) Assignee: Plantronics, Inc., Santa Clara, CA (US)

( * ) Notice: Subject to any disclaimer, the term of this patent is extended or adjusted under 35 U.S.C. 154(b) by 158 days.

(21) Appl. No.: 14/633,606

(22) Filed: Feb. 27, 2015

(65) Prior Publication Data
US 2016/0253487 A1 Sep. 1, 2016

(51) Int. Cl.
*G06F 21/35* (2013.01)
*H04L 29/06* (2006.01)
*H04W 12/06* (2009.01)
*G06F 21/88* (2013.01)

(52) U.S. Cl.
CPC .............. *H04L 63/08* (2013.01); *G06F 21/35* (2013.01); *G06F 21/88* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 5,014,040 A * | 5/1991 | Weaver | | A44C 5/14 340/539.1 |
| 5,075,670 A * | 12/1991 | Bower | | G08B 29/046 340/539.1 |
| 8,115,621 B2 * | 2/2012 | Rajala | | G01S 1/042 340/539.11 |
| 8,170,262 B1 * | 5/2012 | Liu | | H04R 1/1016 381/382 |
| 9,275,234 B2 * | 3/2016 | McGloin | | G06F 21/60 |
| 9,854,385 B2 * | 12/2017 | Oliver | | H04W 4/80 |
| 2003/0025603 A1 | 2/2003 | Smith | | |
| 2007/0008120 A1 * | 1/2007 | Smith | | G06K 7/10108 340/539.26 |
| 2008/0076572 A1 | 3/2008 | Nguyen et al. | | |
| 2009/0041313 A1 | 2/2009 | Brown | | |
| 2009/0098913 A1 * | 4/2009 | Lewis | | H04M 1/05 455/569.1 |
| 2009/0249478 A1 | 10/2009 | Rosener et al. | | |
| 2010/0042848 A1 | 2/2010 | Rosener | | |

(Continued)

FOREIGN PATENT DOCUMENTS

JP 08249546 A * 9/1996

*Primary Examiner* — Michael R Vaughan
(74) *Attorney, Agent, or Firm* — Thomas S. Dienwiebel; Slayden Grubert Beard, PLLC (57) ABSTRACT

A wearable user device is provided, which can be donned and doffed by a user, and which is configured for use in a user authentication system. To enhance the security of a user authentication, the wearable user device comprises a detector device to detect a donned or doffed condition of said wearable user device; and an alert processing module, connected with said detector device. The alert processing module is configured to determine whether said wearable user device is doffed forcefully, and if said wearable user device is doffed forcefully, to transmit an authentication exception corresponding to a forceful doffed condition to an authentication server.

18 Claims, 7 Drawing Sheets

(56) References Cited

U.S. PATENT DOCUMENTS

| | | | |
|---|---|---|---|
| 2013/0225210 A1* | 8/2013 | Rosener | H04M 1/6066 |
| | | | 455/458 |
| 2015/0131085 A1* | 5/2015 | Cooper | G01V 8/16 |
| | | | 356/213 |
| 2015/0193995 A1* | 7/2015 | Naghi | G07C 9/00134 |
| | | | 340/568.1 |
| 2015/0334548 A1* | 11/2015 | Liu | H04W 72/0473 |
| | | | 370/329 |
| 2016/0150350 A1* | 5/2016 | Ingale | H04W 4/70 |
| | | | 370/255 |
| 2017/0046931 A1* | 2/2017 | Hartweg | A47F 7/022 |
| 2017/0277138 A1* | 9/2017 | Kaji | A61B 5/11 |

\* cited by examiner

WEARABLE USER DEVICE FOR USE IN A USER AUTHENTICATION SYSTEM

CROSS-REFERENCE TO RELATED APPLICATIONS

The contents of utility patent application, entitled "Authentication Server For A Probability-Based User Authentication System And Method" by the present inventors, filed on the same day as this application with the United States Patent and Trademark Office and the contents of U.S. utility patent publication 2009/0249478 A1 "USER AUTHENTICATION SYSTEM AND METHOD", filed on Mar. 31, 2008 are incorporated herein by reference for all purposes to the extent that such contents is not inconsistent with the present application.

TECHNICAL FIELD

The present invention relates to the field of computer science and more particularly to user authentication for access of a user to resources, including, e.g., information, computing resources, or restricted building areas.

BACKGROUND

For the purposes of the following description, user authentication typically is understood as the act of proving to a computer-based system that a user is who she or he claims to be. User authentication is often based on providing user credentials in terms of three factors:
 something you know (e.g., a password),
 something you have (e.g., an ATM card), and
 something you are (e.g., a fingerprint).

One or more of these factors are typically verified to authenticate a user. For example, a computer user is required to authenticate him- or herself, when, e.g., logging into his computer account, retrieving e-mail from servers, accessing certain files, databases, networks, web sites, etc. In banking applications, a bank account holder is required to provide his automatic teller machine (ATM) card as a first factor and enter a personal identification number (PIN) as a second factor in order to access the automated teller machine to conduct a banking transaction.

With the increased use of wearable user devices and in particular wearable smart and/or computing devices, it is feasible to use such wearable device in a user authentication system, e.g., for determining whether to authenticate a user for a certain application or whether such authentication should be revoked, depending on the particular circumstances. A corresponding authentication system is disclosed in the above-mentioned utility patent application according to the publication US 2009/0249478 A1.

Since an authentication procedure may be conducted for granting access to restricted information or resources, a security concern may arise in case a wearable device of a user that is used for authentication purposes is stolen, e.g. by a malicious party.

Accordingly, an object exists to provide an improved wearable user device for use in a user authentication system, which enhances the security of a user authentication.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

According to a first aspect of the invention, a wearable user device for use in a user authentication system is provided.

According to said first aspect of the invention, the wearable user device can be donned and doffed by a user. The wearable user device comprises at least a detector device to detect a donned or doffed condition of said wearable user device and an alert processing module, connected with said detector device. The alert processing module is at least configured to determine, whether said wearable user device is doffed forcefully, and if said wearable user device is doffed forcefully, to transmit an authentication exception corresponding to a forceful doffed condition to an authentication server.

The basic idea of one or more embodiments of the present invention is to provide an improved wearable user device, allowing to determine if the wearable user device is doffed forcefully, such as in case the wearable user device is stolen from the user by a malicious party. In case of a forceful doffing, an authentication server is notified of this condition to allow the condition to be considered for a current user authentication or for future user authentications.

In the following explanation of the present invention according to the embodiments described, the terms "connected to" or "connected with" are used to indicate a data connection/transmission link between at least two components, devices, units, or modules. Such a connection may be direct between the respective components, devices, units, or modules or indirect, i.e. over intermediate components, devices, units, or modules. The connection may be permanent or temporary; wireless or conductor based.

As discussed in the preceding, the present first aspect refers to a wearable user device for use in a user authentication system. The wearable user device, also referred to as "wearable device" in the following, may be of any suitable type that can be donned and doffed by a user. The wearable user device may for example be a wearable smart and/or computing device, such as for example a watch, a pendant, a headphone, a headset, a bracelet, an armband, a body strap, an electronic textile, or a head-mounted device. Wearable devices are to be distinguished from carried devices, as for example a cell phone, a laptop, or a key-fob.

The wearable user device according to the present aspect comprises at least the detector device and the alert processing module. The detector device is configured to detect a donned or doffed condition of said wearable user device and thus allows to determine whether the device is currently worn by a user. In the context of the present discussion, a device is in a donned condition when it is in close physical contact with the user, such as in direct contact with the user's skin or with the user's clothing or apparel. The detector device may be of any suitable type to detect said donned and doffed conditions. Examples of a suitable detector devices include a mechanical or an electrical (ohmic, capacitive and/or inductive) switch, where the respective state is changed when the device is donned or doffed, an electric circuit through which a small electric current is passed when the wearable user device is donned, a temperature detector, an RF (radio frequency) coupled detector, and a heart rate detector.

The alert processing module is connected with said detector device and is configured to determine, whether said wearable user device is doffed forcefully. The term "doffed forcefully" in this context relates to the wearable device being doffed or removed from the user by a third party. Exemplary embodiments of how to detect said forceful doffed condition are discussed in the following. In case the wearable user device is doffed forcefully, the alert processing module transmits the authentication exception to an authentication server. The authentication exception corresponds at least to a forceful doffed condition of said wearable user device and may be a message or signal of any suitable type.

The wearable user device may be used in a user authentication system having an authentication server, where a user authentication can be conducted in dependence of whether a forceful doffed condition occurred. The authentication server may be of any suitable type. In general, an authentication server is used in a user authentication process, such as for granting access of a user to resources, including, e.g., information, computing resources, or restricted building areas. Examples of authentication servers are described in the aforementioned utility patent application "Authentication server for a probability-based user authentication system and method" by the present inventors, filed on the same day as this application with the United States Patent and Trademark Office and in utility patent publication US 2009/0249478 A1 "USER AUTHENTICATION SYSTEM AND METHOD", filed on Mar. 31, 2008.

In one exemplary embodiment, the authentication server is formed integrally or co-located with said wearable user device. In another exemplary embodiment, the authentication server is provided externally of or remote from said wearable user device. In both cases, the alert processing module is connected with said authentication server at least temporarily over a suitable wireless or conductor-based connection.

In another embodiment, the wearable user device comprises a computing unit having at least a processor with a suitable programming to provide the functionality of at least some of the modules described herein. The programming may be provided at least in part by software programming and/or by logic circuitry.

Certainly, the wearable user device may in additional embodiments comprise one or more further components, devices, modules, or units. For example, the wearable user device may comprise a housing, a battery or other power supply, and/or one or more user interfaces, such as one or more of a keyboard and a display. The wearable user device may also comprise one or more (network) communication interfaces for conductor-based or wireless operation, such as a Wi-Fi interface for communication according to one of the IEEE 802.11 standards, a cellular communication interface adapted for, e.g., one of the GSM, EV-DO, or LTE standards, a Bluetooth communication interface, and/or an interface for communication according to the IEEE 802.15 group of standards. Some further exemplary additional components are described in further detail in the following description.

In another embodiment, the alert processing module of said wearable user device is configured to determine a doffed condition of said wearable user device from said detector device and upon the determination of said doffed condition, determine whether said wearable user device is doffed forcefully. The present embodiment corresponds to a multi-step procedure, which may reduce the overall computational effort to process the authentication exception.

According to a further additional or alternative embodiment, the alert processing module is configured with a predefined grace time. According to the present embodiment, in case the wearable user device is doffed, but determined to be not doffed forcefully, the alert processing module is configured to transmit said authentication exception in case the doffed condition is determined for a time, greater than the predefined grace time.

The present embodiment increases the security further by also providing said authentication exception in case of a non-forceful doffing, such as in case the user inadvertently doffs the wearable user device. The predefined grace time in this embodiment allows the user to avoid the authentication exception to be transmitted when the wearable user device is donned again before the predefined grace time expires. The user accordingly may "correct" the accidental doffing of the wearable user device during the grace time/period and avoid, e.g., that his authentication is revoked. The grace time may be chosen according to the application, such as a couple of seconds. The grace time may in one embodiment be fixed or predefined. In another embodiment, the grace time is set depending on circumstance, such as location. In this example, a longer grace time may be provided at the user's home location and a shorter grace time may be provided elsewhere.

In an additional embodiment and in case of said non-forceful doffing, said alert processing module is configured to provide a notification message to the user. The notification message may make the user aware, e.g., of the inadvertent doffing, so that it is easily possible to don the device again in time before the grace time expires. The notification message may be of any suitable type, such as in particular a tactile, audible and/or visual indication.

In another embodiment, the wearable user device comprises a user interface, wherein said notification message is transmitted to said user interface. The notification message accordingly is provided to the user via the user interface. The user interface may be of any suitable type and for example may comprise one or more of a speaker, a buzzer, a display, a vibrating alert, and an indicator light. Additionally or alternatively to the preceding and in a further embodiment, said alert processing module is configured to transmit said notification message to at least a further user device. The further user device may be for example a smart phone, a further wearable user device, such as a smart watch, a computer, such as a laptop or a tablet computer, or any other suitable device for receiving and providing the notification message to the user.

For example, the alert processing module may be configured to transmit the notification message to a smart phone of the respective user, e.g., over a Bluetooth connection. Certainly, a combination of the aforementioned embodiments is possible, i.e. an embodiment, where the notification message is provided to the user via a user interface of the wearable user device and to one or more further user devices.

According to another embodiment, the wearable user device comprises a second detector device for detecting a forceful doffing of said wearable device. Said second detector device is connected at least with said alert processing module and may be of any suitable type to determine a forceful doffed condition, i.e. a condition where the wearable user device is doffed forcefully. A forceful doffed condition in general may be determined using one or more suitable sensors. In one embodiment, the second detector comprises a force sensor to determine, whether force is applied during doffing, i.e. removal of the wearable user device, such as using a pressure sensitive resistor. In further additional or alternative embodiments, a forceful doffing may be determined be detecting parameters other than force, such as in particular acceleration, speed of device removal, and/or tensile stress or strain.

In the following description, the aforementioned "detector device to detect a donned or doffed condition" will also be referred to as the "first detector device".

In one embodiment, the second detector device comprises an accelerometer/acceleration sensor. In one example, the accelerometer sensor is a MPU-6500 motion-tracking device, marketed by InvenSense, Inc., San Jose, Calif., USA. In another embodiment, the alert processing module is configured to determine that said wearable user device is doffed forcefully when a detected acceleration value of said accelerometer sensor corresponds to a predefined acceleration threshold value.

The present embodiment is based on the present inventors' recognition that when the wearable user device is doffed forcefully, a relatively high acceleration may be detectable, which is higher than upon an intended doffing of the wearable user device. Upon a forceful doffing, the determined acceleration in one example may be 50% higher compared to an intended doffing. Accordingly, an authentication exception is transmitted by the alert processing module in case the detected acceleration value matches or exceeds the predefined acceleration threshold value.

According to a further embodiment, the second detector device comprises a sensor for providing a force value. The sensor allows the second detector device to determine the force applied when the wearable user device is doffed. The sensor may be of any suitable type and may provide a force value directly or allow for a calculation of a force value, e.g., using predefined design constants of the wearable user device.

In one example, the second detector device comprises a magnetic micro sensor. In another example, the second detector device comprises a stress-dependent magnetoimpedance sensor. In another example, the second detector device comprises a piezoelectric stress/strain sensor. As will be apparent, the preceding examples provide tensile stress or strain readings, which however; using material (e.g. elasticity) and geometry (e.g. cross sectional area) constants allow the second detector device to calculate the applied force.

In another alternative or additional example, the alert processing module is configured to determine that said wearable user device is doffed forcefully when a detected force value corresponds to a predefined force threshold value.

The aforementioned embodiment is based on the present inventors' recognition that upon a forceful doffing, e.g., of a smart watch by a thief, a relatively high force may be detectable at least in a part or component of the wearable user device, such as a watchband. Upon a forceful doffing, the determined force in one example may be 50% higher compared to an intended doffing. In this embodiment, the authentication exception is transmitted by the alert processing module in case the detected force value matches or exceeds the predefined force threshold value.

According to another embodiment, the second detector device comprises a proximity sensor. The proximity sensor may be of any suitable type. For example, the proximity sensor may comprise an optical sensor for determining the distance to a surface, such as the user's skin or clothing. In another embodiment, said alert processing module is configured to determine that said wearable user device is doffed forcefully when a detected device removal speed corresponds to a predefined removal speed value.

Corresponding to the preceding determination of a forceful doffing based on a detection of a high acceleration; a high device removal speed may be detectable upon a forceful doffing, which is higher than upon an intended doffing of the wearable user device. In one example, the device removal speed may be 50% higher compared to an intended doffing. In one example, the device removal speed is determined by measuring the distance of the wearable user device to a surface, such as the user's skin or clothing at least two times subsequently and calculating the speed from the increase in distance over time. A variation of this procedure is conducted, e.g., by accelerometers, such as the above-mentioned MPU-6500 motion-tracking device, to determine, whether the user has fallen, also referred to as "build-in fall detection". An authentication exception in this embodiment is transmitted by the alert processing module in case the detected removal speed value matches or exceeds the predefined removal speed threshold value.

According to a further embodiment, the second detector device comprises a don/doff sensor to detect a donned or doffed condition of said wearable user device, arranged spaced from the first detector device. Examples of a suitable don/doff sensor include a mechanical or an electrical (ohmic, capacitive and/or inductive) switch, where the respective state is changed when the device is donned or doffed, an electric circuit through which a small electric current is passed when the wearable user device is donned, a temperature detector, an RF (radio frequency) coupled detector, and a heart rate detector.

According to a further embodiment, the alert processing module is configured to determine whether said wearable user device is doffed forcefully by comparing the time of detection of the doffed condition by the first detector device with the time of detection of the doffed condition of the second detector device. By comparing the two times of detection of the doffed condition, it is possible to determine a device removal speed value and to compare said device removal speed value with the predefined removal speed threshold value, as discussed in the preceding.

It should be noted that the respective value or sensor reading in all of the above embodiments, obtained from the second detector device, may be provided in a data format that is directly comparable with corresponding threshold value. Otherwise, at least one data conversion module may be provided that converts one or both of the values to allow a comparison thereof by the alert processing module.

In a further embodiment, the wearable user device comprises a latching device to removable secure said wearable user device to a body part of the user or to apparel. In this embodiment, the second detector device comprises a latch sensor to detect an unengaged state and an engaged state of said latching device.

The latching device may be of any suitable type to attach the wearable user device to the user or to apparel/clothing of the user. For example, the latching device in case the wearable user device is a smart watch or a wristband may correspond to a typical watchband buckle or clasp. The latch sensor is configured to determine, whether said latching device is in an engaged state, i.e. where the wearable user device is secured to the user or to his apparel, or in an unengaged state, allowing to non-forcefully doff the wearable user device. In one example, the latch sensor is configured to pass a weak current through the latch to test for continuity.

According to a further embodiment, the alert processing module is configured to determine that said wearable user device is doffed forcefully in case said doffed condition is determined while said engaged state of said latching device is determined simultaneously. It should be apparent that in case the user intended to doff the wearable user device, he would bring the latching device into the unengaged state, so that the engaged state of the latching device while doffing indicates a forceful doffing. It is noted, that the term "simultaneously" in the context of the present embodiment includes slight deviations regarding the timing of the determination of the doffed condition and the engaged state.

While the above mentioned embodiments for the determination of a forceful doffing of the wearable user device provide favorable results, it is nevertheless possible that the second detector device comprises more than one of the sensors mentioned in the preceding. In this case the alert processing module may be configured to determine whether said wearable user device is doffed forcefully from the multiple sensors according to the above discussion.

According to another embodiment, the wearable user device comprises a training module, connected at least with said (first) detector device. The training module is configured to generate user I/O pattern data comprising don and doff characteristics and to transmit said user I/O pattern data to a user behavior database.

The present embodiment allows to use the wearable user device also in a training system, as described in the above-mentioned utility patent application "Authentication server for a probability-based user authentication system and method" by the present inventors, filed on the same day as this application with the United States Patent and Trademark Office. The don and doff characteristics may in this context comprise any suitable information regarding the detected donned and doffed conditions, such as one or more of duration of donned condition, duration of doffed condition, time of donned condition, time of doffed condition, determination of forceful doffing, and time/date of forceful doffing.

The don and doff characteristics, once provided to the user behavior database, may form part of user behavior information, which may be used by an authentication probability evaluation module to determine a user probability value according to the aforesaid utility patent application. The training module may be configured for one time transmittal of the user I/O pattern data or for a recurring transmittal, e.g., according to predefined time intervals.

Certainly, further embodiments are conceivable comprising multiple of the aforesaid embodiments.

A second aspect relates to a user authentication system. According to the present aspect, a user authentication system is provided with at least an authentication server and a wearable user device.

The wearable user device can be donned and doffed by a user and comprises at least a detector device and an alert processing module. The detector device is configured to detect a donned or doffed condition of said wearable user device. The alert processing module is connected with said detector and configured to determine whether said wearable user device is doffed forcefully and if this is the case, to transmit an authentication exception, corresponding to a forceful doffed condition to said authentication server.

The authentication server according to the present aspect is configured to authenticate the user based on whether said authentication exception is received. The authentication server may in one example operate according to the procedure, described in utility patent publication US 2009/0249478 A1 "USER AUTHENTICATION SYSTEM AND METHOD", filed on Mar. 31, 2008, as mentioned in the preceding. In particular and in one exemplary embodiment, the authentication server is configured to revoke an authentication of the user when said authentication exception is received. The authentication may for example relate to access of a user to resources, including, e.g., information, computing resources, or restricted building areas.

In another embodiment, the authentication server may operate according to the disclosure of utility patent application "Authentication server for a probability-based user authentication system and method" by the present inventors, filed on the same day as this application with the United States Patent and Trademark Office. In this embodiment, the user authentication system is probability based. The authentication server comprises an authentication probability evaluation module for receiving an authentication request comprising at least user identification data. The authentication exception additionally comprises exception user identification data.

The (exception) user identification data in this context comprises at least information, allowing to determine a specific authorized user and, in context of the above mentioned utility patent application "Authentication server for a probability-based user authentication system and method", allowing to determine a corresponding record of user behavior information from the user information database. For example, the user identification data may comprise a specific user ID, a user token, or a user account, associated with an authorized user.

The authentication probability evaluation module in this embodiment is configured upon reception of an authentication request to determine whether said user identification data of said authentication request corresponds to exception user identification data of a received authentication exception and if this is the case, to reject said authentication request.

The present aspect allows the authentication exception to be considered in a probability-based user authentication system, e.g., according to the description in the aforesaid utility patent application "Authentication server for a probability-based user authentication system and method". In case of a forceful doffing of the wearable user device, the authentication probability evaluation module rejects the received authentication request, so that no access is granted to the requested resource in view of the potentially reduced security due to the detected forceful doffing of the wearable user device.

In one embodiment, the authentication probability evaluation module rejects said received authentication request by setting a user probability value correspondingly. For example, the user probability value is then set to its lowest setting, such as zero.

Certainly, the authentication system and server may in further embodiments be configured according to one or more of the embodiments, described in the aforesaid utility patent application "Authentication server for a probability-based user authentication system and method". Correspondingly, the wearable user device may in further embodiments be configured according to one or more of the embodiments, described in the preceding, e.g., with reference to the first aspect.

A third aspect relates to a method of providing an authentication exception from a wearable user device, which can be donned and doffed by a user. According to the present method, it is determined whether said wearable user device is doffed forcefully and if said wearable user device is doffed forcefully, an authentication exception corresponding to a forceful doffed condition is transmitted to an authentication server.

The wearable user device may in further embodiments be configured according to one or more of the embodiments, described in the preceding, e.g., with reference to the first and/or second aspects.

A computer program or module may be provided to enable a wearable user device and/or a processor to carry out the method discussed above. The computer program may be contained on a computer readable medium, such as a solid state, magnetic or optical storage device.

These and other aspects of the invention will be apparent from and elucidated with reference to the embodiments described hereinafter.

DETAILED DESCRIPTION OF PREFERRED EMBODIMENTS

Technical features described in this application can be used to construct various embodiments of a wearable user device and a user authentication system, according to the description herein.

In the field of computer science and in particular in the field of user authentication for access to resources, it has been identified that with the increased use of wearable user devices and in particular wearable smart and/or computing devices, it is feasible to use such wearable device in a user authentication system, e.g., for granting access to restricted information or resources. However, when using a wearable user device for authentication purposes, a security concern may arise in case the wearable device is stolen, e.g., by a malicious party.

In one approach, the present inventors have recognized that a wearable user device may be provided, that is configured to determine if the wearable device is doffed forcefully, such as in case the wearable device is stolen from the user by a malicious 3rd party.

In case of a forceful doffing, an authentication server is notified of this condition to allow the condition to be considered for a current user authentication or for future user authentications. Thus, the security of the respective authentication is improved.

Reference will now be made to the drawings in which the various elements of embodiments will be given numerical designations and in which embodiments will be discussed so as to enable one skilled in the art to make and use the invention.

Specific reference to components, devices, units, modules, process steps, and other elements are not intended to be limiting. Further, it is understood that like parts bear the same reference numerals, when referring to alternate figures. It is furthermore noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

In the following explanation of the present invention according to the embodiments described, the terms "connected to" or "connected with" are used to indicate a data connection/transmission link between at least two components, devices, units, or modules. Such a connection may be direct between the respective components, devices, units, or modules or indirect, i.e. over intermediate components, devices, units, or modules. The connection may be permanent or temporary; wireless or conductor based.

For example, a connection may be provided over a WAN (wide area network), LAN (local area network), PAN (personal area network), comprising the Internet, Ethernet networks, cellular networks, Bluetooth networks, and/or Wi-Fi networks using a corresponding suitable communications protocol.

Figure 1A:
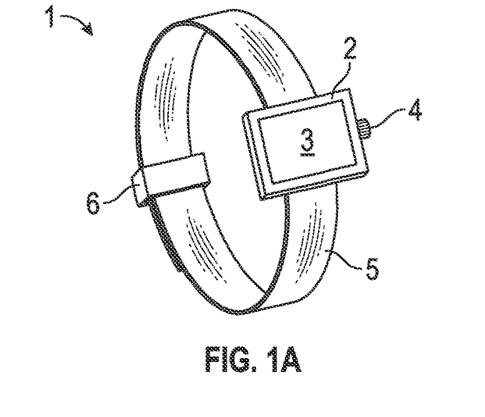
FIG. 1A shows a first embodiment of a wearable user device in a schematic perspective view.

FIG. 1A shows a first embodiment of a wearable user device in a schematic view, namely a smart watch 1. Smart watch 1 comprises a watch housing 2, comprising a touch screen 3 and a watch crown 4, which form a user interface 22 of smart watch 1 together with an integrated speaker (not shown). A watchband 5 comprises a latch 6, which can be brought into an engaged and a disengaged state and thus allows donning and doffing of the smart watch 1. The smart watch 1 is configured for use in a user authentication system. In particular, smart watch 1 is configured to determine whether the device is donned or doffed and in case the device is doffed, whether smart watch 1 is doffed forcefully, e.g., by a malicious third party, and to provide an authentication exception in this case to an authentication server of said user authentication system (both not shown in FIG. 1A).

Figure 2:
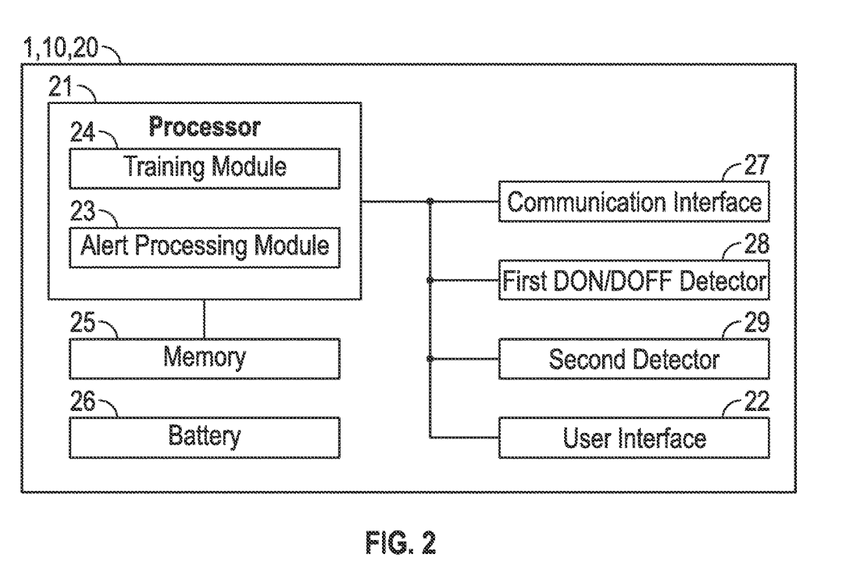
FIG. 2 shows a schematic block diagram of the embodiments according to FIGS. 1A-1C.

Turning to the schematic block diagram of FIG. 2, smart watch 1 comprises a processor 21 with an alert processing module 23 and a training module 24. The processor 21 is connected with solid-state memory 25, i.e. RAM, ROM and/or flash memory. Memory 22 comprises machine-readable instructions according to programming or software, which when loaded into processor 21 and subsequently executed, provides the functionality of alert processing module 23 and the training module 24. Certainly, the processor 21 is configured to execute further processes, according to the user's usage of the smart watch 1.

The watch 1 further comprises a rechargeable battery 26, a communication interface 27, configured for operation via Bluetooth, a first detector device 28 to detect a donned or doffed condition of said smart watch 1, and a second detector device 29 to detect a forceful doffing of the smart watch 1. According to the present example, the first detector device 28 comprises a proximity sensor having an infrared LED and an infrared photodiode (both not shown) on the rear side of watch housing 2 to detect contact with the user's arm. The second detector device 29 comprises a latch sensor (not shown), integrated with said latch 6. The latch sensor comprises a micro switch (not shown) and provides a signal, corresponding to the aforementioned engaged and disengaged states of the latch 6.

Figure 3:
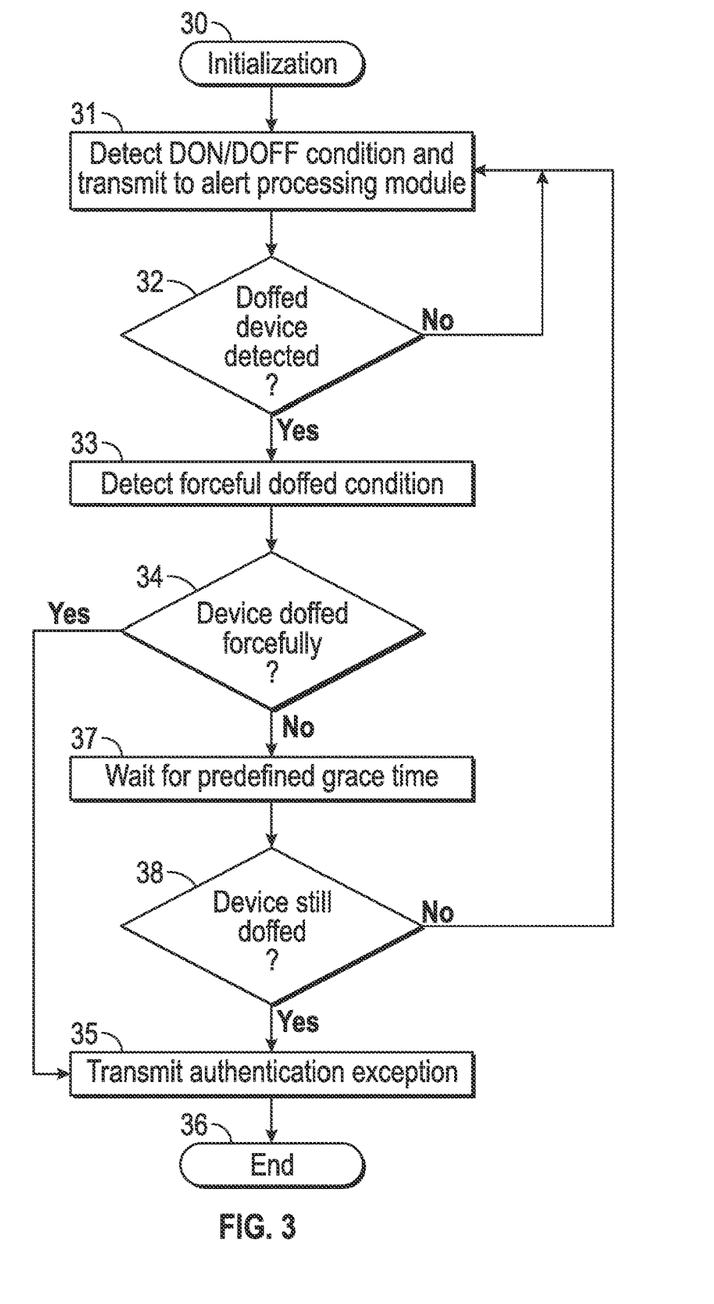
FIG. 3 shows a schematic flow chart of the operation of the embodiments according to FIGS. 1A-1C.

FIG. 3 shows a schematic flow chart of the operation of the embodiment according to FIG. 1A. In step 30, the user of the smart watch 1 initializes by donning the device, closing the latch 6 and entering her or his PIN on the touch screen 3. This step could be conducted after waking up and before leaving the user's home or another location that is considered safe. Upon successful initialization, the alert processing module 23 transmits a message to the authentication server corresponding to the successful initialization, so that the authentication server may delete all prior authentication exceptions for the respective wearable user device. Step 30 also initializes training module 24, the operation of which is explained in the following with reference to FIG. 6.

After the initialization, the first detector device 28 determines the current donned or doffed condition of the smart watch 1 in step 31 and transmits information regarding the current condition to alert processing module 23. As mentioned in the preceding, the first detector device 28 comprises an IR proximity sensor to determine the donned or doffed condition, wherein a donned condition is detected when after the successful initialization in step 30, the user's arm is continuously proximate.

In step 32, the alert processing module 23 determines, whether a doffed condition is detected, i.e. whether the smart watch 1 was doffed by its user. If no doffed condition is determined in step 32, the preceding process is repeated with step 31 after a predefined timeout. In case a doffed condition is determined, the alert processing module 23 provides an audio notification message to the user using the integrated speaker and simultaneously, a visual notification message on touch screen 3. Furthermore, in step 33 the alert processing module 23 queries the second detector unit 29, whether a forceful doffed condition is detected, such as in case the smart watch 1 is removed from the user's arm by a thief.

To determine the forceful doffed condition, the second detector unit 29 detects whether the latch 6 is in the engaged or the disengaged state using the connected latch sensor. The determination of a forceful doffed condition by detecting the state of latch 6 is based on the assumption that in case of an intended doffing of the smart watch 1 by its user, such as for example when washing her or his hands, the user would open the latch 6. Accordingly, in this scenario, the latch sensor would detect a disengaged state of latch 6. In the case of a theft, the smart watch 1 in contrast would be pulled with a relatively high force from the user's arm, so that the watchband 5 would typically disengage the watch housing 2. To provide that this is always the case, the latch 6 in one embodiment has a higher opening force, than the connection of the watchband 5 with the watch housing 2, forming a predetermined breaking point.

Accordingly, a forceful doffed condition in the embodiment of FIG. 1A is detected in case the first detector device 28 detects a doffed condition in step 31 and the second detector device 29 detects an engaged state of latch 6 in step 33. In case it is determined in step 34 that the smart watch 1 is doffed forcefully, the alert processing module 23 in step 35 transmits the authentication exception to the authentication server (not shown) using the communication interface 27. The authentication exception corresponds to the determined forceful doffed condition and furthermore comprises exception user identification data, such as a user ID that has been previously assigned to the user by the authentication system. The exception user identification data allows the authentication server to determine, for which user the authentication exception occurred and then to conduct the provided steps. The operation of an exemplary authentication server is described in further detail in the following.

After the authentication exception is transmitted, the present operation ends in step 36. To re-activate the process, the initialization according to step 30 as discussed in the preceding, has to be conducted, i.e. the device has to be donned and the user's PIN needs to be entered.

In case it is determined by the alert processing module 23 in step 34 that the smart watch 1 was not forcefully doffed, the alert processing module 23 waits for a predefined grace period/time, e.g., 3 seconds, in step 37. In step 38, the alert processing module 23 determines, whether the smart watch 1 is still doffed by respectively querying the first detector device 28. In case the smart watch 1 is determined to be still doffed after the grace period expired, the authentication exception according to step 35 is transmitted. Otherwise the operation is continued with step 31 and no authentication exception is transmitted.

The preceding steps are conducted to allow the user to "correct", e.g., an inadvertent doffing of the smart watch 1. The user in such case is notified of the doffed condition by the notification messages, provided in step 33 and can restore the previous "safe" condition by donning the smart watch 1 and closing latch 6. In this case, no authentication exception is transmitted.

The initialization in step 30 also starts the simultaneous operation of the training module 24, as discussed above. The operation of training module 24 in a corresponding training cycle is shown in the exemplary flow chart of FIG. 6. The operation corresponds to the operation of the embodiment of FIGS. 5-7 of utility patent application "Authentication server for a probability-based user authentication system and method" by the present inventors, filed on the same day as this application with the United States Patent and Trademark Office. The wearable user device accordingly corresponds to an input device.

Figure 6:
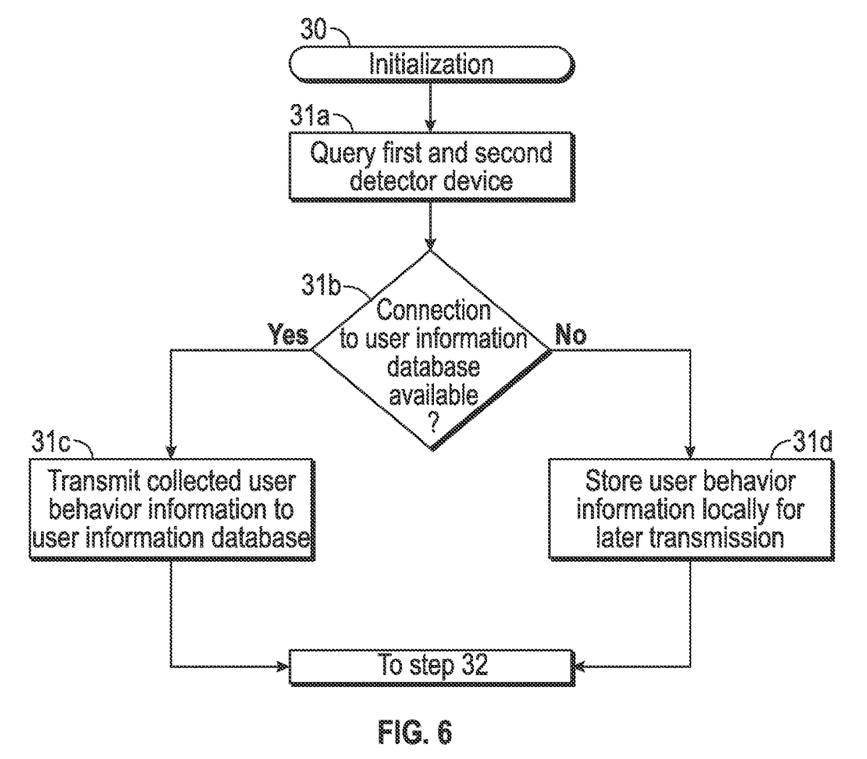
FIG. 6 shows a detailed flow chart of the operation of a training module in a training cycle.

Upon initiation in step 30, the first detector device 28 and the second detector device 29 are queried to obtain user behavior information in step 31a. The training module 24 in this step collects user behavior information, namely user I/O pattern data, comprising duration of donned condition, duration of doffed condition, time of donned condition, time of doffed condition, determination of forceful doffing, and time/date of forceful doffing.

In step 31b it is determined, whether a connection to a user information database (not shown) of the authentication system can be established. If this is the case, the training module 24 in step 31c transmits the collected user behavior information to the user information database, upon which the determined user data becomes "past" user data, i.e. information of past user behavior for a later determination of a probability of requestor identification.

As is explained in detail in the referenced utility patent application, the user behavior information is used for a probability-based user authentication to determine a user probability value. Accordingly, information regarding an inadvertent doffing of the smart watch 1 may be used to determine the user probability value and, e.g., lower the user probability value in case of a detected doffing.

In case no connection with the user information database can be established, the user behavior information is stored locally in the memory 25 of smart watch 1 and transmitted, when a connection can be established, according to step 31d. In both cases, the operation then continues with step 32, as discussed. The operation of training module 24 is stopped in step 36 and resumes when the smart watch 1 is reinitialized.

Figure 1B:
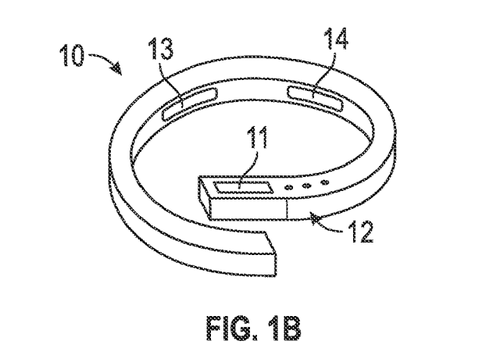
FIG. 1B shows a second embodiment of a wearable user device in a schematic perspective view.

FIG. 1B shows a second embodiment of a wearable user device in a schematic view, namely a smart wristband 10. Wristband 10 is configured as a portable music player and is connectable to wireless headphones via Bluetooth. Wristband 10 comprises a display 11 and buttons 12, which together with a vibration alert unit (not shown) form a user interface 22. The internal configuration of wristband 10 corresponds to FIG. 2, as discussed in the preceding, with the exception of user interface 22, the first detector device 28, and the second detector device 29. The first detector device 28 for detecting the donned and doffed conditions in this embodiment comprises two contact pads 13 and 14, which are comparable to contact pads of a typical heart rate monitor. The contact pads 13 and 14 allow the first detector device 28 to determine the user's EKG signal and thus to determine, whether the device is donned (EKG signal present) and doffed (no EKG signal present). The EKG signal may be determined according to any suitable procedure.

The second detector device 29 comprises a sensor for determining the applied force (not shown). The sensor in this embodiment comprises a piezoelectric strain sensor, such as a DT-series piezo film sensor, available from Measurement Specialties, Hampton, Va., United States. The force value is calculated by the second detector device 29 from the determined strain reading of the sensor using the respective geometry and material (E) constants of wristband 10.

The sensor thus allows to determine/calculate the force applied when doffing the wristband 10. The alert processing module 23 according to the present embodiment is configured to determine a forceful doffed condition in case a detected force value matches or exceeds a predefined force threshold value. According to the present embodiment the predefined force threshold value is set between 1000-1800 grams, or greater.

The operation of the embodiment of FIG. 1B corresponds to the operation, described in the preceding with reference to FIG. 3.

Figure 1C:
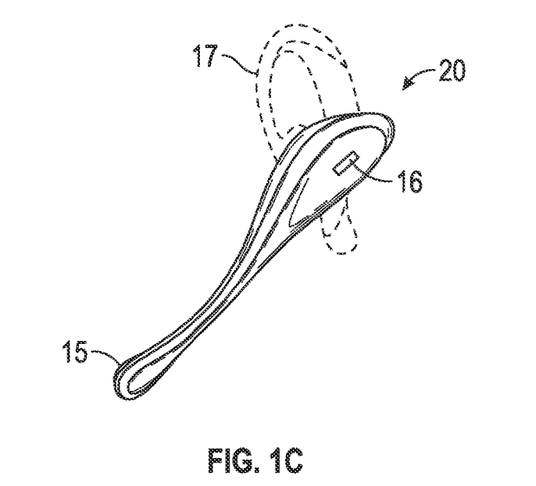
FIG. 1C shows a third embodiment of a wearable user device in a schematic perspective view.

FIG. 1C shows a third embodiment of a wearable user device in a schematic view, namely a headset 20. The headset 20 comprises a speaker (not shown), a microphone 15, an activation button 16, and an optional ear hook 17. The headset 20 is configured for audio communication over a Bluetooth connection, such as to a computer or a smart phone (both not shown).

The internal configuration of headset 20 corresponds to FIG. 2, as discussed in the preceding, with the exception of user interface 22, first detector device 28, and second detector device 29. The user interface 22 according to the embodiment of FIG. 1C comprises said activation button 16 and a piezo buzzer (not shown). The first detector device 28 comprises a don/doff detector/sensor as described in detail in patent application publication US 2009/0249478 A1, entitled "USER AUTHENTICATION SYSTEM AND METHOD". The second detector device 29 comprises an accelerometer sensor (not shown) to detect a forceful doffed condition. The accelerometer/acceleration sensor is a MPU-6500 motion-tracking device, marketed by InvenSense, Inc., San Jose, Calif., USA. A forceful doffed condition is detected by the second detector device 29 when a detected acceleration value matches or exceeds a predefined acceleration threshold value. According to the present embodiment the predefined acceleration threshold value is set to 2 m/s$^2$.

The operation of the embodiment of FIG. 1C corresponds to the operation, described in the preceding with reference to FIG. 3, with the exception of initialization step 30 and the provision of a notification message in step 32.

Corresponding to the discussion in the above-referenced patent application publication US 2009/0249478 A1, paragraph 0068, initialization step 30 in conjunction with the embodiment of FIG. 1C requires the user to don the headset 20 and then to enter her or his password into a personal computer (not shown). The notification message in step 33 is provided using the piezo buzzer, discussed in the preceding.

The embodiments of a wearable user device, as discussed in the preceding with reference to FIGS. 1A-1C, 2, and 3, are configured for use in an authentication system, having an authentication server. In this context, the authentication server may, e.g., be used in a user authentication process, such as for granting access of a user to resources, including, e.g., information, computing resources, or restricted building areas.

In one example the authentication server may operate according to the discussion of the above-mentioned utility patent publication US 2009/0249478 A1 "USER AUTHENTICATION SYSTEM AND METHOD", where the authentication server is additionally configured to revoke the authentication when receiving said authentication exception.

In another example the authentication server may operate according to the discussion of utility patent application "Authentication server for a probability-based user authentication system and method" by the present inventors, filed on the same day as this application with the United States Patent and Trademark Office, incorporated herein by reference for all purposes to the extent that such contents is not inconsistent with the present application. The aforementioned utility patent application describes a probability-based user authentication system and a corresponding authentication server. In this system, the authentication server comprises an authentication probability evaluation module, which is configured to determine a user probability value, corresponding to the probability that a requestor, i.e. a person that requests to be authenticated for a respective application, is the authorized user for which authentication is requested.

Figure 4:
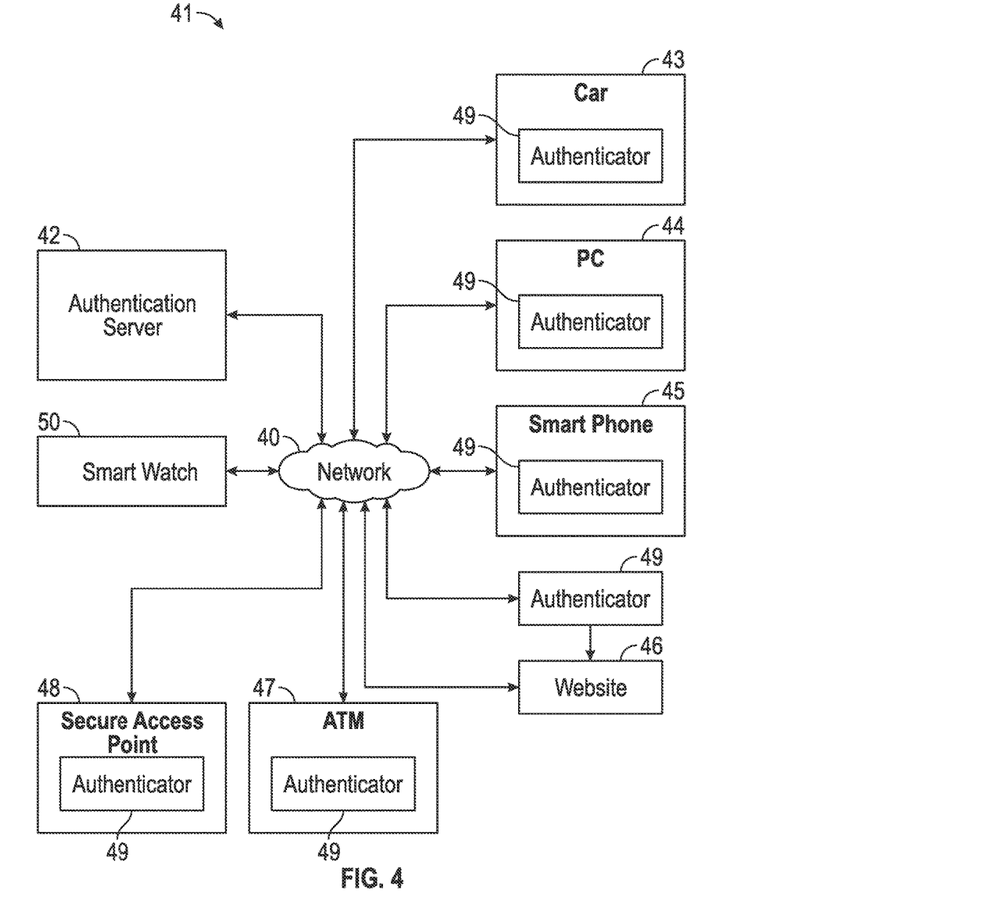
FIG. 4 shows an embodiment of a probability-based user authentication system with an authentication server, multiple application devices, and a wearable user device.

FIG. 4 shows a an embodiment of a probability-based user authentication system 41 with an authentication server 42, multiple application devices 43-48, and a wearable user device, namely smart watch 50 in a schematic block diagram. The probability-based user authentication system 41 corresponds to the probability-based user authentication system 1, discussed in the above-mentioned utility patent application "Authentication server for a probability-based user authentication system and method" in particular in conjunction with FIG. 1 of the referenced utility patent application, with the exception of further smart watch 50. The setup and operation of car 43, PC 44, smart phone 45, website 46, ATM 47, security access point 48, and authenticators 49 corresponds to the setup of the respective devices, described in detail in above-mentioned utility patent application "Authentication server for a probability-based user authentication system and method", e.g. with reference of FIGS. 1 and 2 of the referenced utility patent application.

Smart watch 50 corresponds to smart watch 1, discussed with reference to FIG. 1A of the present explanation with the exception that the communication interface 27 is additionally adapted for communication over Wi-Fi, so that the authentication exception can be transmitted to authentication server 42 over network 40.

Figure 5A:
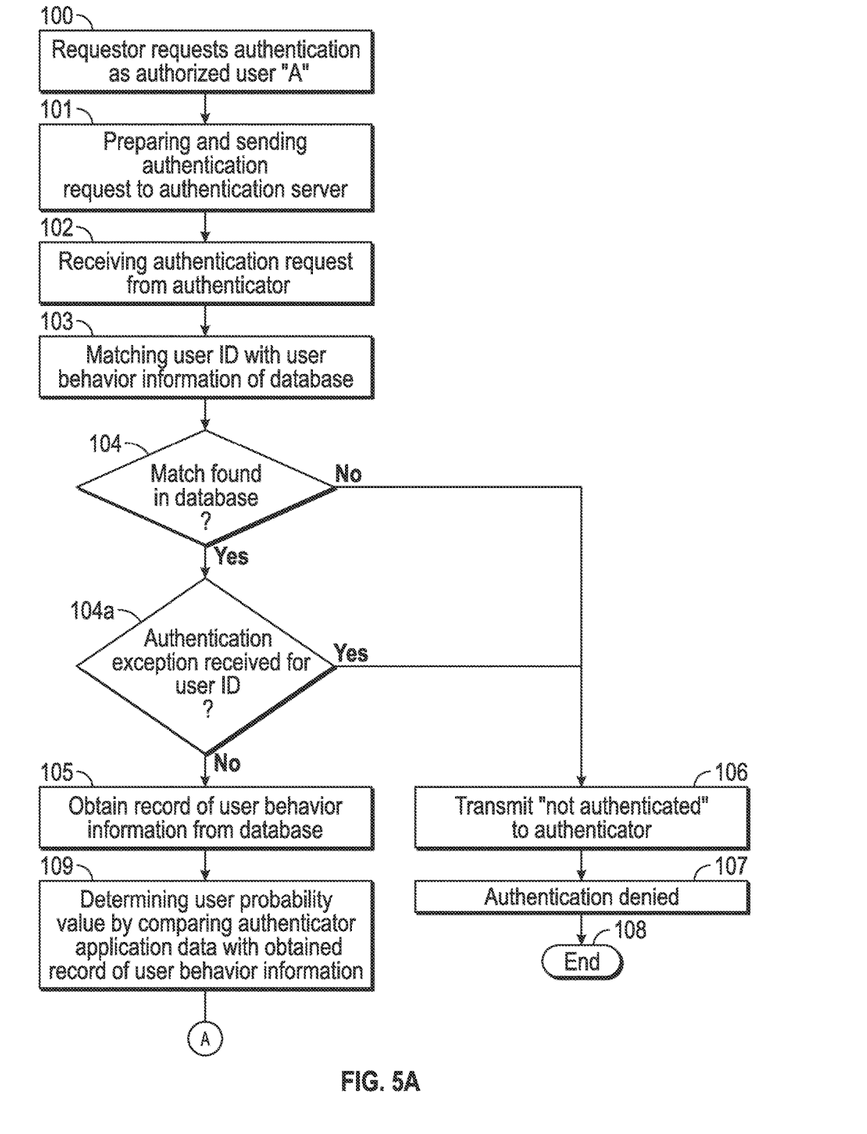
FIGS. 5A and 5B show a flow chart of an exemplary probability-based authentication method.
Figure 5B:
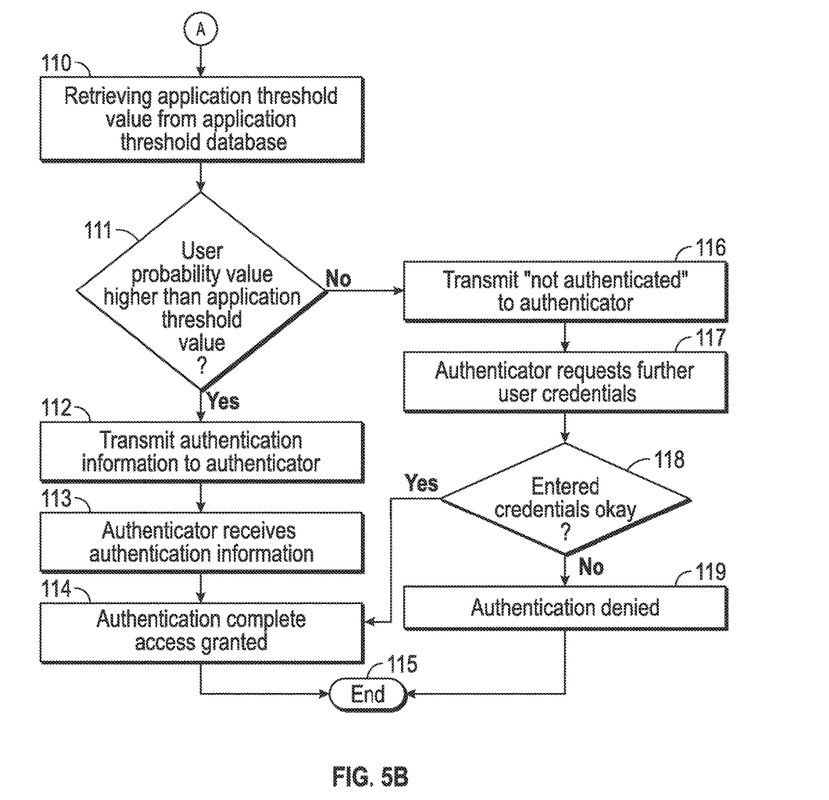

FIGS. 5A and 5B show a flow chart of an exemplary probability-based authentication method. The present example corresponds to the example, explained in conjunction with FIGS. 3A and 3B of the above-mentioned utility patent application "Authentication server for a probability-based user authentication system and method", with the exception of additional step 104a.

In step 104a, the authentication probability evaluation module of authentication server 42 determines, whether an authentication exception has been received and is stored for the present user ID. This step is conducted by comparing the exception user identification data of all received authentication exceptions with the user ID of the authentication request. As discussed in the preceding, in case an authentication exception is received, but the user successfully initializes the wearable user device after the authentication exception is received, the authentication server 42 deletes the authentication exception for the respective wearable user device. This may be useful in case the wearable user device is doffed forcefully, but then provided back to the user. The discussed PIN entry in the initialization step 30 avoids misuse by a malicious party.

In case an authentication exception is present, the authentication server in step 106 transmits a message to the respective authenticator 49, corresponding to a "not authenticated" condition. The authentication of the requestor is then denied in step 107 and the authenticator 49 shows a message on a connected display that access is denied. The authentication procedure ends in step 108.

In case no authentication exception is present, the operation continues in step 105 as discussed in conjunction with FIGS. 3A and 3B of the above-mentioned utility patent application "Authentication server for a probability-based user authentication system and method".

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein
   the authentication server is integrated with wearable user device 1, 10, 20,
   the functionality of training module 24 and/or alert processing module 23, instead of being provided by executing software, being provided by dedicated circuitry formed integrally with processor 21 or externally thereof,
   in the embodiment of FIG. 4, the system 41 comprises additional wearable user devices, such as one or more of wristband 10, and headset 20,
   in the embodiment of FIG. 4, the system 41 instead of smart watch 50, comprises one or more of wristband 10, and headset 20, and/or
   the wearable user device 1, 10, 20 comprises a positioning module, such as GPS module, and said authentication exception comprises positioning information.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or embodiments does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A wearable user device, which can be donned and doffed by a user, the wearable user device comprising:
   a detector device to detect a donned or doffed condition of said wearable user device,
   an alert processing module, connected with said detector device, and
   a second detector device for detecting whether the wearable user device was forcefully doffed or unforcefully doffed;
   wherein said alert processing module is configured:
   to determine whether said wearable user device is in the doffed conditions;
   upon determination of said doffed condition, to determine whether said wearable user device was forcefully doffed or unforcefully doffed;
   wherein in case said wearable user device is forcefully doffed then to:
      transmit an authentication exception corresponding to a forcefully doffed condition to an authentication server based on a determination that the wearable user device was forcefully doffed; and
      require reauthentication of the user;
   wherein in case said wearable user device is unforcefully doffed, withhold the authentication exception.

2. The wearable user device according to claim 1, wherein said alert processing module is configured to, in case said wearable user device is not forcefully doffed, transmit said authentication exception to said authentication server in case a doffed condition is determined for a time, greater than a predefined grace time.

3. The wearable user device according to claim 2, wherein said alert processing module is configured to, in case a doffed condition is determined and said wearable user device is forcefully doffed, provide a notification message to a user.

4. The wearable user device according to claim 3, further comprising a user interface, wherein said alert processing module is configured to transmit said notification message to said user interface.

5. The wearable user device according to claim 3, wherein said alert processing module is configured to transmit said notification message to a further user device.

6. The wearable user device according to claim 1, wherein said second detector device comprises an accelerometer sensor and said alert processing module being configured to determine that said wearable user device is forcefully doffed when a detected acceleration value corresponds to a predefined acceleration threshold value.

7. The wearable user device according to claim 1, wherein said second detector device comprises a sensor for providing a force value and said alert processing module being configured to determine that said wearable user device forcefully doffed when the detected force value corresponds to a predefined force threshold value.

8. The wearable user device according to claim 1, wherein said second detector device comprises a proximity sensor and said alert processing module being configured to determine that said wearable user device is forcefully doffed when a detected device removal speed value corresponds to a predefined removal speed threshold value.

9. The wearable user device according to claim 1, further comprising a latching device to removably secure said wearable user device to a body part of the user or to apparel, wherein said second detector device comprises a latch sensor to detect an unengaged state and an engaged state of said latching device.

10. The wearable user device according to claim 9, wherein said alert processing module being configured to determine that said wearable user device was forcefully doffed when said doffed condition is determined and said engaged state of said latching device is determined simultaneously.

11. The wearable user device according to claim 1, wherein said second detector device comprises multiple sensors of the group of sensors consisting of: an accelerometer sensor, a sensor for determining force, a proximity sensor, a don/doff sensor, and a latch sensor; and said alert processing module is configured to determine whether said wearable user device was forcefully doffed from multiple of said sensors.

12. The wearable user device according to claim 1, further comprising a training module, connected at least with said detector device and being configured to generate user I/O pattern data comprising don and doff characteristics and to transmit said user I/O pattern data to a user behavior database.

13. A wearable user device, which can be donned and doffed by a user, the wearable user device comprising:
   a detector device to detect a donned or doffed condition of said wearable user device,
   an alert processing module, connected with said detector device, and
   a second detector device for detecting whether said user device was forcefully doffed or unforcefully doffed;
   wherein:
   said alert processing module is configured:
     to determine whether said wearable user device is in the doffed condition;
     upon determination of said doffed condition, to determine whether said wearable user device was forcefully doffed or unforcefully doffed;
     based upon a determination that said wearable user device was forcefully doffed to transmit an authentication exception corresponding to a forceful doffed condition to an authentication server; and
   said second detector device comprises a don/doff sensor to detect a donned or doffed condition of said wearable user device, arranged spaced from the detector device, and said alert processing module being configured to determine that said wearable user device was forcefully doffed or unforcefully doffed by comparing the time of detection of the doffed condition of the detector device with the time of detection of the doffed condition of the second detector device.

14. A user authentication system with at least an authentication server and a wearable user device, wherein the wearable user device can be donned and doffed by a user, and wherein the wearable user device comprises:
   a detector device to detect a donned or doffed condition of said wearable user device,
   an alert processing module, connected with said detector device, and
   a second detector device for detecting whether said wearable user device was forcefully doffed or unforcefully doffed; and
   wherein said alert processing module is configured to:
   determine whether said wearable user device is in the doffed condition;
   upon determination of said doffed condition, determine whether said wearable user device was forcefully doffed or unforcefully doffed;
   wherein in case said wearable user device was forcefully doffed, to:
     transmit an authentication exception corresponding to a forceful doffed condition to said authentication server based on a determination that the wearable user device was forcefully doffed;
     require authentication of the user;
   wherein in case said wearable user device was unforcefully doffed, withhold the authentication exception; and
   wherein said authentication server is configured to authenticate the user based on whether said authentication exception is received.

15. The user authentication system according to claim 14, wherein said authentication server is configured to revoke an authentication of the user when said authentication exception is received.

16. The user authentication system according to claim 14, wherein
   said authentication system is a probability-based user authentication system;
   said authentication server comprises an authentication probability evaluation module for receiving an authentication request comprising at least user identification data from an authenticator;
   said alert processing module is configured to transmit said authentication exception to said authentication probability evaluation module;
   said authentication exception additionally comprises exception user identification data;
   and
   said authentication probability evaluation module is configured upon reception of said authentication request to determine, whether said user identification data of said authentication request corresponds to exception user identification data of a received authentication exception; and
   if said user identification data of said authentication request corresponds to said exception user identification data, to reject said authentication request.

17. A method of providing an authentication exception by a wearable user device, which can be donned and doffed by a user, wherein:
   it is determined from a first detector device whether said wearable user device is in a doffed condition;
   upon determination of said doffed condition, determining from a second detector device whether the wearable user device was forcefully doffed or unforcefully doffed;
   when it is determined whether said wearable device is removed and forcefully doffed:
     transmitting an authentication exception corresponding to a forceful doffed condition to an authentication server; and
     require reauthentication of the user; and
   when it is determined that said wearable device was unforcefully doffed, withholding the authentication exception.

18. A non-transitory computer-readable medium including contents that are configured to cause a wearable user device to:
   determine from a first detector device whether said wearable user device is in a doffed condition;

upon determination of said doffed condition, determine whether the wearable user device was forcefully doffed or unforcefully doffed;

upon a determination that the wearable user device was forcefully doffed;
- transmit an authentication exception corresponding to a forceful doffed condition to an authentication server; and
- require reauthentication of the user;

upon a determination that said wearable device was unforcefully doffed, withhold the authentication exception.

\* \* \* \* \*